US007163201B2

(12) United States Patent
Bernstein

(10) Patent No.: US 7,163,201 B2
(45) Date of Patent: Jan. 16, 2007

(54) TWO STATION VISE

(75) Inventor: Leon M. Bernstein, Minnetonka, MN (US)

(73) Assignee: Kurt Manufacturing Company, Inc., Minneapolis, MN (US)

( * ) Notice: Subject to any disclaimer, the term of this patent is extended or adjusted under 35 U.S.C. 154(b) by 184 days.

(21) Appl. No.: 10/998,482

(22) Filed: Nov. 29, 2004

(65) Prior Publication Data

US 2006/0049566 A1 Mar. 9, 2006

Related U.S. Application Data

(60) Provisional application No. 60/607,730, filed on Sep. 7, 2004.

(51) Int. Cl.
*B23Q 3/08* (2006.01)
*B25B 1/20* (2006.01)

(52) U.S. Cl. .......................................... 269/32; 269/43

(58) Field of Classification Search .................. 269/43, 269/136, 138, 153, 154, 292, 906, 32, 221
See application file for complete search history.

(56) References Cited

U.S. PATENT DOCUMENTS 5,242,159 A 9/1993 Bernstein
6,012,712 A 1/2000 Bernstein
6,017,026 A 1/2000 Durfee, Jr.
6,170,814 B1 1/2001 Swann et al.
6,244,580 B1 6/2001 Durfee, Jr.
6,250,620 B1 6/2001 Durfee, Jr.
6,409,161 B1 6/2002 Wolff et al.

OTHER PUBLICATIONS

Bock Hydraulic Units, 1 page, published Jun. 7, 2001.
Product Review of Chick Machine, Inc. Hydraulic Vice, 1 page, published Aug. 1991.
Chick Workholding Systems Hydraulic Information, 1 page, published Feb. 18, 1991.
Toolex Advertisement for Workholding System, 1 page, published at least as early as Jan. 2003.

*Primary Examiner*—Robert C. Watson
(74) *Attorney, Agent, or Firm*—Nickolas E. Westman; Westman, Champlin & Kelly, P.A.

(57) ABSTRACT

Two station vise for manual or hydraulic operation with a quick-change stationary that can be carvable, hard or reversible. the stationary jaw having two precision through holes is placed on expanding pins, located on the top longitudinal rails of the vise body, that precisely position and tighten the stationary block in place. Two movable jaws connected by a tubular drive form an axially adjustable floating assembly. A manually turned tubular drive has an external threaded screw to move simultaneously the first jaw/nut and an internal thread that moves the second jaw/nut, on the opposite side of the stationary. Hydraulically parts are clamped at the two stations with a piston located in the second jaw/nut and connected axially with the first jaw/nut by the tubular drive. A setup-block located at the front jaw/nut keeps both jaws at proper position for loading and unloading of parts. The setup-block also allows for pre-clamping or retention of the part in the rear station before clamping.

16 Claims, 9 Drawing Sheets

TWO STATION VISE

CROSS-REFERENCE TO RELATED APPLICATIONS

The present application is based on and claims the benefit of U.S. provisional patent application Ser. No. 60/607,730, filed Sep. 7, 2004, the content of which is hereby incorporated by reference in its entirety.

BACKGROUND OF THE INVENTION

A two station vise has a body with two longitudinal rails. A stationary jaw block is mounted between two movable jaws. Two special expanding pins located on the rails precisely position and hold stationary jaw block by fitting into two straight holes in the stationary jaw. A tubular drive with internal and external threads connect two movable jaws forming a compact axially adjustable floating assembly which setup both movable jaws and simultaneously clamp a variety of parts with both movable jaws.

A setup sliding block is placed inside a front jaw nut between the vise rails and holds a floating assembly to pre-clamp a part in the rear clamping station to retain the parts.

To clamp parts manually, the tubular drive is turned and external and internal threads move simultaneously drawing the front jaw/nut and the rear jaw/nut inward toward the stationary block. Hydraulically, parts are clamped with a piston located in one jaw/nut and connected axially with the other jaw/nut by the tubular drive. Both jaw nuts contain pre-load spring plungers that are compressed for clamping and by manually retracting movable jaw and releasing them.

In the prior art, various hydraulically operated vises have been known in the past, and in some instances, two station vises that will accept parts of different sizes on opposite sides of the stationary center jaw have been provided.

SUMMARY OF THE INVENTION

The present invention relates to a two-station vise operated manually or hydraulically. the vise includes a vise body with two longitudinal rails. A stationary cross block or jaw is mounted between two opposed movable jaws that are connected together with a compact tubular drive. The vise includes a system to quickly change the stationary and movable jaws.

The vise has two different features for pre-clamping parts before final clamping. One or two parts can be pre-clamped to retain the parts in position before final clamping.

For loading and unloading parts before clamping, the front or first jaw nut contains a setup block which slides between the rails and with friction provides a load for positioning and holding of both nuts.

For manual clamping, the tubular drive screw is turned and axial springs in the setup block preload the part in the rear or second station.

For hydraulic and manual clamping, either one or two parts are preliminarily preloaded. Each nut contains an axial spring plunger which keeps the movable jaws in an extended position. The parts are loaded into the vise when the movable jaws are manually retracted and released, and the spring loaded plungers and the movable jaws will retract against the axial spring to apply the pre-clamp load as the movable jaws are initially closed onto a part.

Final clamping by both movable jaws occurs simultaneously, either hydraulically or manually, after the parts are properly positioned. The final clamping forces against the stationary block are equalized with a floating movable jaw system.

The stationary block has two through holes that are quickly and precisely positioned on and securely held by expanding pins that are anchored to the longitudinal rails and extend upwardly from the rails.

Manual rotation of the tubular drive, which has external and internal different direction, but same pitch threads, provides clamping simultaneously of the two parts. The tubular drive changes the distance between the jaw nuts and transfers axial force. The internal threads receive a telescoping shaft.

Hydraulically, both parts are clamped by pressurizing a cylinder located in the rear jaw nut. The piston, connected to the tubular drive, changes the distance between the jaw nuts and transfers axial tension force. When pressure is relieved, a strong return spring retracts the piston and releases the parts.

The floating jaw system insures that there is no thrust loading between the vise body and the jaws, and also insures that the force that clamps the parts on opposite sides of the stationary jaw will be equal.

The specific showing of the present vise arrangement includes a pre-load plunger that will be provide a pre-load force on each of the parts in the two station vise to hold the parts positioned for retaining the parts until the final high force clamping. A high direct compression force, through the parts in the two station, is provided for final clamping either a hydraulically or manually using the tubular drive vise screw.

DETAILED DESCRIPTION OF THE PREFERRED EMBODIMENTS

Figure 1:
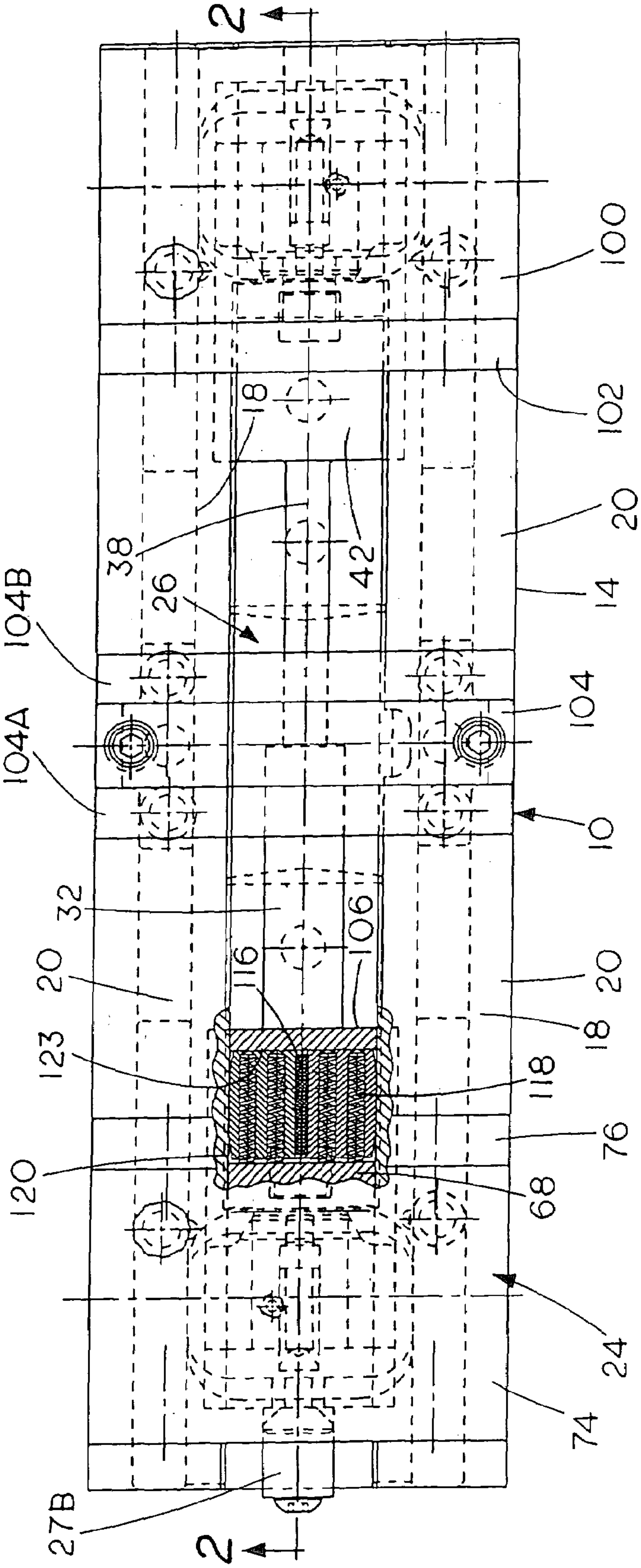
FIG. 1 is a top plan view of a two station vise made according to the present invention.

A two station vise 10 made according to the present invention has a vise body 11 that extends longitudinally along a central axis. The vise body includes a base plate or wall 12 and upstanding side rails 14 on opposite sides thereof, as can be seen for example in FIGS. 3–6.

The rails 14 have upper end flanges 18, on opposite sides thereof, with co-planar upper surfaces 20 on the top of flanges 18, and inwardly facing edge surfaces 22 that are spaced apart. The edge surfaces 22 define a jaw guide space and extend along a length of the vise body. The surfaces 22 guide a floating vise jaw assembly indicated generally at 24. The rails 14 are spaced to form a longitudinally extending recess 26. The floating vise jaw assembly 24 moves in the recess, as guided by the surfaces 22, 22 of the side rails 14.

The floating vise jaw assembly 24 includes a front or first jaw nut 28 that has a threaded bore in which a tubular drive or telescoping vise screw 30 is rotatably supported. The tubular drive telescoping vise screw 30 includes a tubular drive threaded screw section 32 that has internal threads 34 in a longitudinal bore and external threads 36 on the outer surface that engage threads on the front jaw nut 28. The interior opening of tubular screw section 32 threadably receives a solid shaft screw 38 with a threaded head 39 engaging the internal threads 34. Shaft screw 38 in turn has an integral sliding shaft extension or portion 40 that slides into a bore of a rear or second jaw nut 48.

A spring loaded axially extension pin 41 in a cross bore in head 39 has ends that spring load against the internal threads 34 and places a known drag on the internal threads 34.

Sliding shaft extension 40 has an annular flange 42 at the inner end thereof. The sliding shaft extension 40 is axially slidably mounted in a bore 43 in the rear or second jaw nut 48. A piston 44 is slidably mounted in a cylinder bore 46 formed in the end of the rear or second jaw nut 48. The piston 44 is threaded onto the end of sliding shaft extension 40 so they move as a unit.

The floating jaw assembly 24 is retained in recess 26 with an upright lug 27A (FIGS. 2 and 3) at the rear of the recess 26, that stops outward movement of the jaw nut 48. A removable stop 27B that is held in place with a screw 27C, at the front end of the vise recess 26, which stops front jaw nut 28 from moving out of the vise body.

The rear jaw nut 48 has a counter bore or recess 50 around the inner end portion of the bore 43 in which a compression coil spring 52 of suitable strength is positioned around the sliding shaft extension 40. The spring 52 abuts against an inner surface of the annular flange 42, and a shoulder at the end of counter bore 50. The spring 52 acts to urge the nut 48 relative to sliding shaft portion 40 until the piston 44 seats against the inner end of bore 46.

In order to prevent rotation of the vise screw section 38, including the sliding shaft extension or portion 40, relative to rear jaw nut 48, a longitudinally extending pin 54 (FIGS. 2 and 8) is secured in partial bores in the jaw nut 48 adjacent the periphery of the recess 50 and in flange 42, with a portion of the body of the pin 54 seated in a part cylindrical recess in the flange 42. The other body portion of the pin 54 in a part cylindrical recess in the jaw nut 48, that opens to the recess or chamber 50. Pin 54, when secured in place by threading an end into a smaller size inner end bore provided in the nut 48, will prevent rotation of the vise screw section 38 and the sliding shaft extension 40 relative to nut 48, but will permit sliding in a longitudinal axial direction between the sliding shaft extension 40 of the vise screw 38 and the rear jaw nut 48.

The remote end of the sliding shaft extension 40 has a threaded bore 58 that receives a fitting for a hydraulic line 60 which leads from a source of hydraulic fluid under pressure comprising a schematically shown pump and valve unit 59. The bore 58 in the piston opens to a central passageway 62 that connects to radially extending passageways 62A, which will provide for a flow of hydraulic fluid under pressure from line 60 between an inner end of the piston 44, and the end of the bore 46, to provide hydraulic pressure tending to move the piston 44 outwardly from the inner end of the bore 46. Movement of the piston 44 outwardly loads the screw assembly 30 in tension.

The tubular vise screw section 32 has a solid front end portion 33 at an opposite end from the vise screw section 38. A recessed hex opening indicated in dotted lines at 66 in FIG. 2 and in solid lines in FIG. 3 is formed in the front end portion 33 of vise screw section 32 into which a conventional manual drive vise wrench can be placed for threading the tubular drive telescoping vise screw sections manually.

The front or first jaw nut 28 has a through bore that has the internal threads to receive the external threads 36 on the tubular vise screw section 32. Both the first jaw nut 28 and the second jaw nut 48 have neck portions 68 (FIGS. 4 and 5) that fit between and are guided by surfaces 22.

The neck portion 68 of front jaw nut 28 has a head 70 integral therewith that fits into an opening or recess 72 of a first vise jaw 74. The first vise jaw 74 has a conventional, hard vise jaw plate 76 shown in place. The recess 72 has an opening 78 at a lower side of the jaw 74 through which the head 74 extends. An inclined ramp surface 80 is at an end of the recess 72 and defines a clamping surface at the end of opening 78 that is adjacent the vise jaw plate 76. The recess 72 has a second end surface that also inclines outwardly from an edge 79 of the opening 78 on the opposite side from inclined surface 80. The edge 79 is a planar surface that extends laterally across the opening 72 on a back side of nut head 70.

Figure 3:
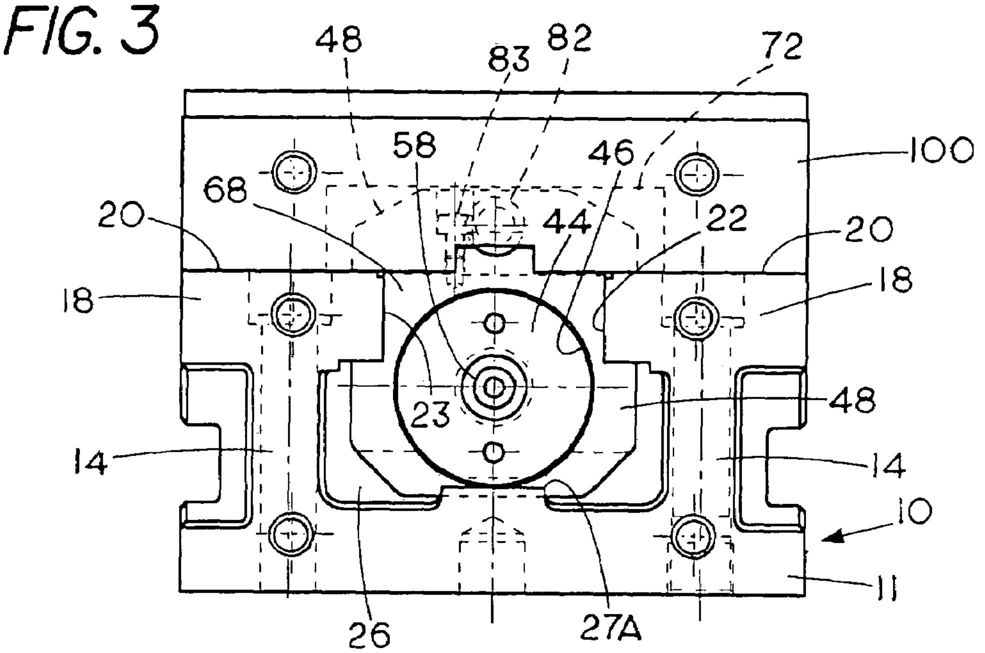
FIG. 3 is an end view of the vise of FIGS. 1 and 2 taken from the right hand end shown in FIG. 2.
Figure 4:
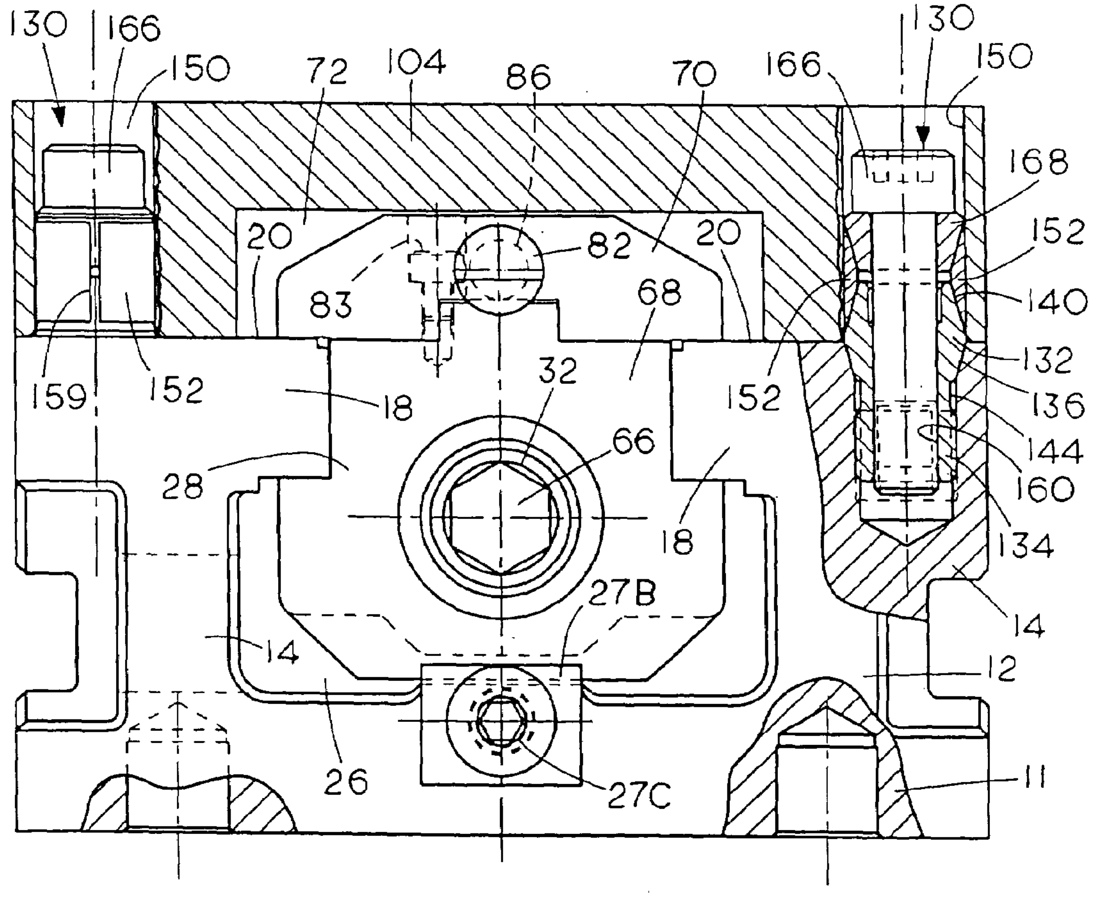
FIG. 4 is a left hand end view of the vise taken from the left hand side of FIG. 2, with parts broken away to show the cross section of a front jaw which is broken away at the outer edges to show a pin lock system for a center stationary vise block or jaw.
Figure 5:
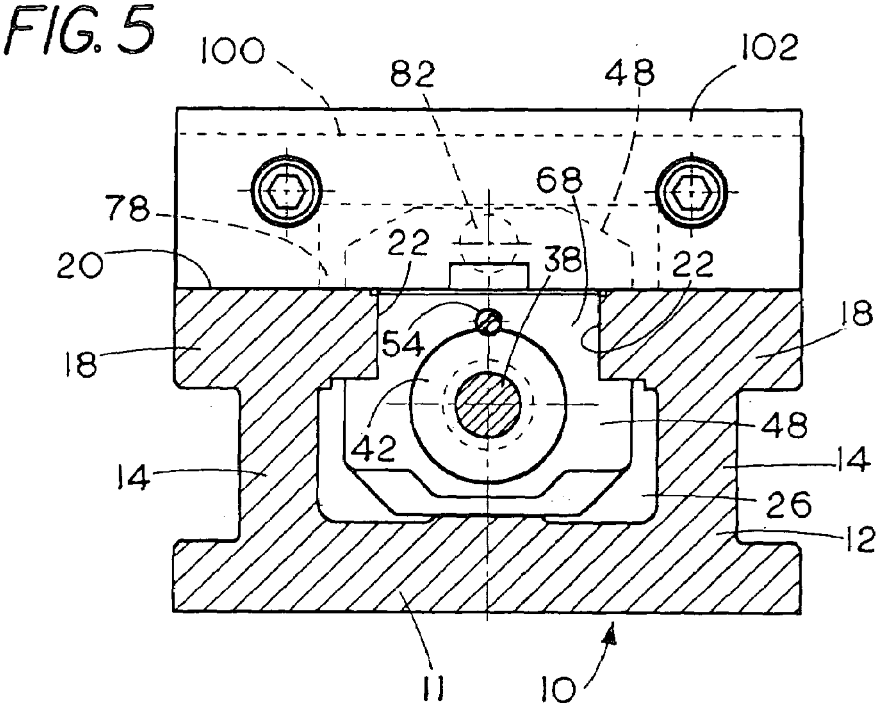
FIG. 5 is a sectional view taken along line 5—5 in FIG. 2.

In FIG. 3, the opening 72 is shown in dotted lines, to show that the opening 72 is wider than the width between the surfaces 22. Opening 72 is also shown in solid lines in FIG. 4. The head 70, as can be seen in FIG. 4, has side portions that rest on and slide along rail surfaces 20.

The head 70 has a bore 87 formed therein, that mounts a plunger housing 82. The plunger housing 82 is held in the bore 87 in head 70 with a screw 83, shown in dotted lines in FIG. 4. A bore in the plunger housing 82 slidably mounts a plunger 86 that has a wedge surface 88 at a forward end thereof that is the same angle as the inclined ramp surface 80 of head 70 and mates with the inclined ramp surface 80 at the end of the jaw opening 72. A spring 90 is mounted in the bore 84. The spring 90 acts against the plunger 86, to urge the wedge surface 88 outwardly from the bore 82 until stopped by a flange 96 that is connected to the plunger 86.

The wedge surface 88 of the plunger engages the forward surface 80 at the clamping end of the recess 72 in jaw 74.

Figure 2:
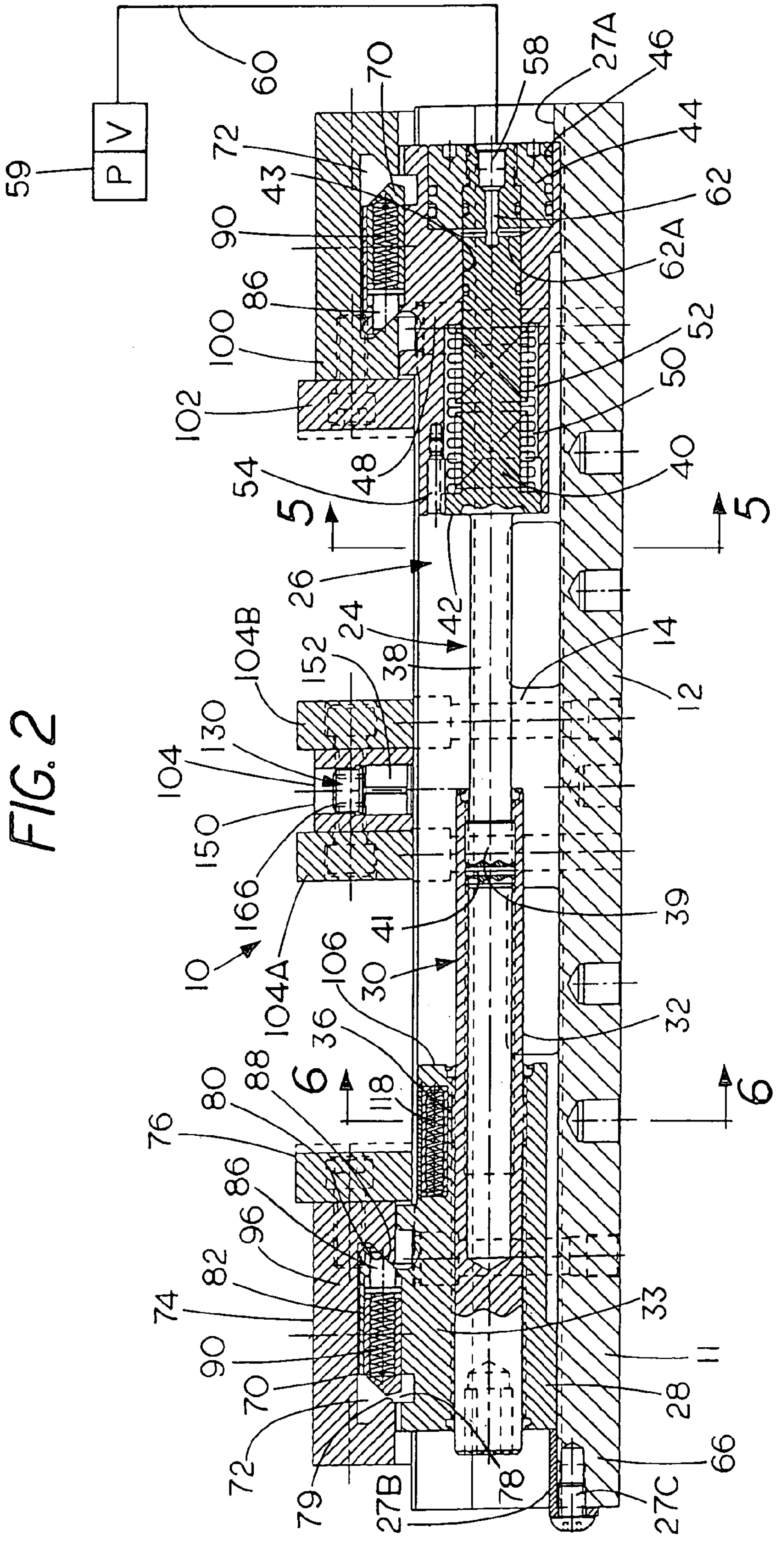
FIG. 2 is a longitudinal sectional view taken along lines 2—2 in FIG. 1.

The plunger 86 can be retracted as shown for illustrative purposes in FIG. 2, where in solid lines the inclined camming surface of the plunger housing and the head 70 are shown against the surface 80, which form a mechanical or direct compression loading on the front or first jaw 74. In actuality, when the jaws are retracted, the force on the jaw nut 28 is less than that resisted by the spring 90, and the plunger 86 will extend outwardly a selected amount, as limited by the collar 96 engaging the end of the bore in plunger 82. This will move the jaw plate 76 to its dotted line position.

It should be noted that the same numbers are used in connection with the pre-load plunger 86, the head 70 of jaw nut 48, and the recess 72 for the nut head 70 in a rear or second jaw 100 since the recess and the plunger mounting are for the opposite side from that shown in the jaw 70, but are made exactly the same.

The second or rear jaw 100 carries a hard jaw plate 102, that faces a center stationary jaw or block 104 in the center of the vise and which is supported on the rail surfaces 20. The center stationary jaw or block has removable jaw plates 104A and 104B mounted thereon.

Figure 6:
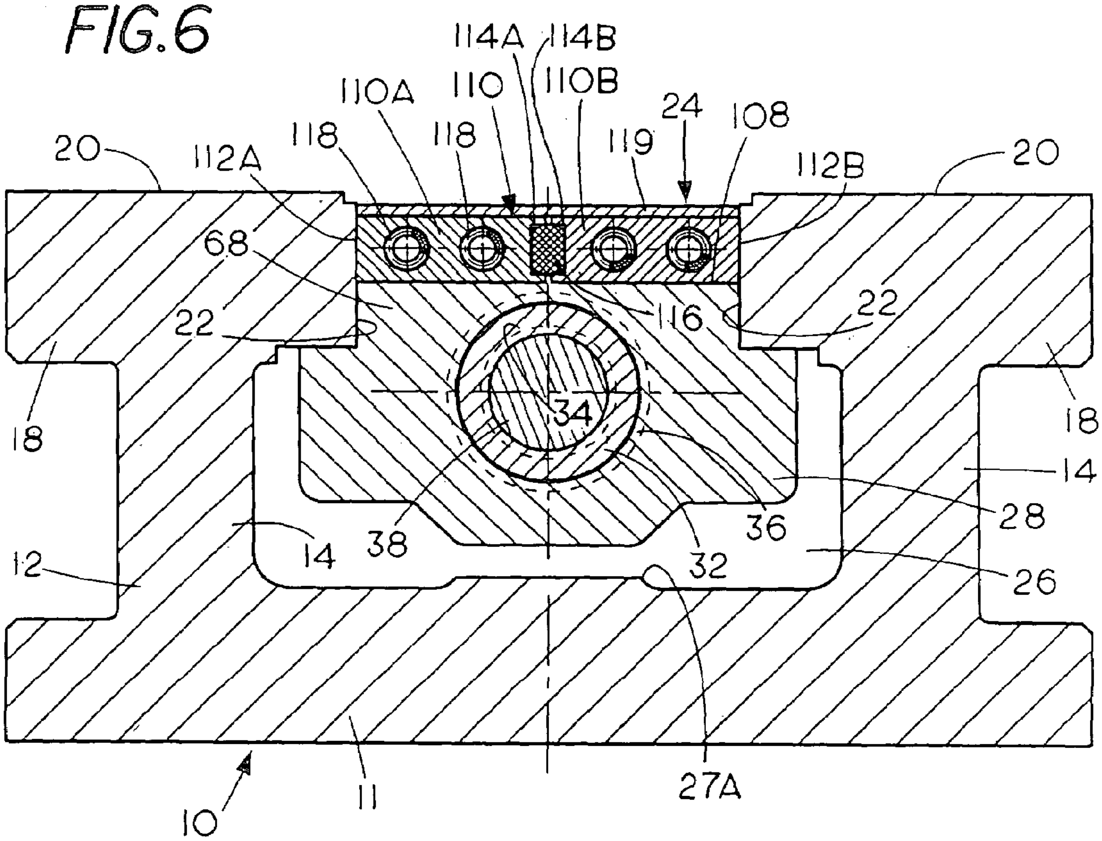
FIG. 6 is an enlarged sectional view taken along line 6—6 in FIG. 2 with the center stationary jaw removed for sake of clarity.
Figure 7:
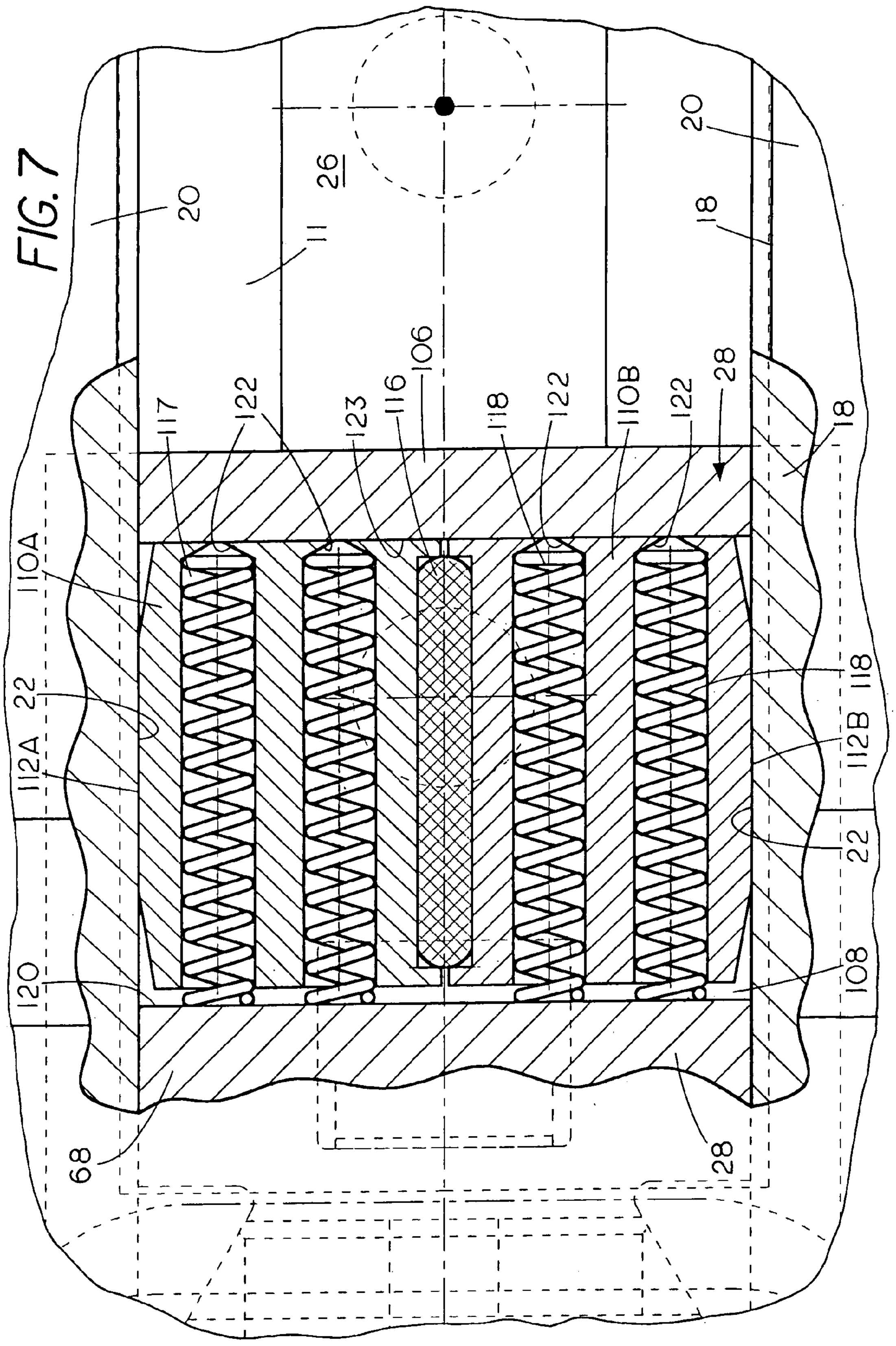
FIG. 7 is a fragmentary sectional top view showing details of a setup slide block with parts in section to illustrate internal springs that act to retract the vise jaws when the clamping pressure is released.

The front jaw nut 28 also has a forwardly extending portion 106, as shown in FIGS. 6 and 7, that is positioned between the surfaces 22 of the rails 14, and is provided with a flat bottom recess 108 that extends across the portion 106 of the nut 28, and is below the plane of the support surfaces 20. The recess 108 has end surfaces 120 and 123 and provides a space for mounting a sliding, two section setup sliding block assembly 110. The setup block 110 has a first section 110A and a second section 110B that are side by side in the recess 108 and positioned between surfaces 22 of the vise rails.

The block sections 110A and 110B also slide on the bottom surface of the recess 108. The sides of recess 108 are open and outer side surfaces 112A and 112B of the block sections 110A and 110B engage and will slide against the surfaces 22 of the rails 14 when the front jaw nut 28 is moved. The sliding setup block sections 110A and 100B have facing recesses 114A and opening to a center plane at facing edges of the block sections. The facing recesses 114A and 114B together form a chamber that holds an elastomeric (resilient) pin or plug 116, which is of size so it is compressed when the two sliding block sections 110A and 110B are positioned between the surfaces 22 and in recess 108. The elastomeric pin or plug 116, since it is compressed when the sliding setup block 110 is assembled, exerts a force tending to separate the sliding block sections 110A and 110B. This force urges the side surfaces 112A and 112B of the sliding block sections against the surfaces 22 on the sides of the rails 14 to provide a frictional loading on the sliding block assembly 110.

It can be noted in FIG. 6, that there is a space between the facing edges of the block portions 110A and 110B along the center plane of the jaw nut where the plug 116 is positioned.

Each of the sliding block sections 110A and 110B is provided with two longitudinal bores 117 that have springs 118 therein. The springs 118 react against surface 120 that is formed at the trailing end of the recess 108 in the first or front jaw nut 28. The springs 118 react against an end surface 122 of each of the bores 117 in the sliding block sections 110A and 110B (See FIG. 7). The bores 117 do not pass all the way through the block sections 110A and 110B, but are ended so that the springs 118 will provide a force in direction outwardly from the sliding block assembly 110 to tend to push the nut 28, which is not frictionally held, away from the sliding block until end surface 123 at the end of recess 108 hits the sliding block 110.

In FIG. 7 in particular, it can be seen that the inner ends 122 of the bores 117 are formed so that the springs 118 will engage the surface 122 and the springs 118 will provide a force against the inner end surface 120 of recess 108 tending to push jaw nut 28 away from the sliding block assembly and also away from the center block 104. The friction loading of the sliding block assembly 110 resulting from the elastomeric resilient force from plug 116 forcing the surfaces 112A and 112B against the surfaces 22 is greater than the force of springs 118. Thus, the block assembly 110 will remain in the position relative to rails 14 to which the jaw nut 28 is moved under force of the vise screw until the friction force on sliding setup block assembly 110 is exceeded by the force from the vise screw moving jaw nut 28.

When the jaw nut 28 is not clamping a part, the springs 118 will then tend to push the jaw nut 28 to the position shown in FIG. 7 in a direction away from the part being clamped. This is the position of the jaw nut and sliding block assembly when the vise screw, or the hydraulic actuator, as will be further explained, is loosened or backed off from a clamped part. The springs 118 will thus urge the jaw nut 28 to loosen the part being clamped. The sliding block assembly 110 provides a reaction block for the springs 118 to move the jaw nut to reduce the holding force to release a part when the clamping force from the vise screw is reduced or backed off. When the jaw nut 28 is driven by a force greater than the friction force holding the sliding block assembly 110 in position, the jaw nut 28 and the sliding block assembly 110 will move together along surfaces 22. The sliding block assembly 110 and springs 118 are covered with a chip shield plate 119, as shown in FIG. 6.

The stationary center block 104 is secured in place with quick change lock pins that precisely position and securely clamp the quick change center block 104 against the surfaces 20 of the side rails 14. The quick change lock pins are shown in detail in U.S. patent application Ser. No. 10/912,301, filed Aug. 5, 2004 for VISE STATIONARY JAW QUICK LOCKING SYSTEM, the content of which is incorporated by reference. The stationary center block or jaw 104 is held in place with two lock pin assemblies 130, shown in FIG. 4. In FIG. 4, the edge portion of the front jaw and of the center block are broken away to show the lock pins.

One of the lock pin assemblies 130 is shown in cross section, and will be referred to. An outer lock pin housing 132 is threaded into a bore 144 in the respective rail 14. The pin housing 132 has an external threaded portion 134 at its lower end. A midportion of the pin housing 132 forms a downwardly facing, outwardly flared exterior cone surface 136. This cone surface 136 seats on a mating cone surface formed around the upper end of the bore 144 in the respective rail 14.

The pin housing maximum diameter is along the surface 22 of each of the rails 14 when the pin housing cone surface 136 is seated in bore 144. The pin housing 132 then tapers inwardly with an outwardly and upwardly facing cone-wedge surface 140. The pin housing 132 upper end terminates at a portion spaced above the supporting surface 22 of the respective rail 14. Each pin housing 132 has an interior hex socket at its upper end so that the pin housing can be tightened down with the threaded portion 134 threaded into the bore 144 and tightly forced to seat cone surface 136. When the pin housings 132 are tightened down, the outwardly tapering conical surface 136 seats and centers on the mating cone surface at the upper end of the bore 144. The mating cone surfaces will tightly hold and precisely center the pin housings 132 in a fixed, accurate position.

The stationary center block 104 has a pair of bores 150 that are spaced the same center distance as the bores 144 in the vise rails. The bores 150 are substantially the same diameter as the diameter of the pin housing 132 at the surface 22, which is the maximum diameter of the respective pin housings 132. To secure the center block 104 in position, a capscrew 166 is threaded into a threaded end portion of a central bore 160 in the respective pin housing 132. The capscrew 166 passes through a slotted expanding sleeve 152. The slotted expanding sleeve is an axially split sleeve, and the split is shown at 154 on the left hand pin assembly 130 in FIG. 4. The split 154 is also shown in the longitudinal section views of FIGS. 2 and 8–11.

The expanding sleeves 152 have inner cone surfaces at both their upper and lower ends. One end cone surface of expanding sleeve 152 mates with the outer cone surface 140 at the upper end of the respective pin housing 132. An upwardly facing and outwardly tapered conical surface is formed at an opposite (upper) end of expanding sleeve 152, as can be seen in FIG. 4. A cone wedge collar 168 is mounted under the head of the capscrew 166 and surrounds the capscrew. The lower end of wedge collar has an outer expanding conical surface that seats into and mates with the upper internal cone surface on the expanding sleeve 152. When installing the stationary block 104, the bores 150 are slipped over the respective lock pin assemblies 130 after the housings are in place and before the expanding sleeve is expanded at all. The stationary block 104 is positioned precisely on the pin housings 132, which are rigidly seated in the bores 144.

The cone wedge collar 168 has a flat or planar surface upper end surface around a bore for the capscrew 166. The flat upper end surface is underneath the head of the capscrew 166. The head of the capscrew will slide on the upper surface of the cone wedge collar 168, when the capscrew is tightened into the threads of the pin housing 132. The head of the capscrew will force the cone wedge collar 168 downwardly so that the outer conical surface of the cone wedge collar bears against the interior conical surface of the expanding sleeve 152, and this wedging action will expand the expanding sleeve 152 as the capscrew 160 is tightened. The expanding sleeve 152 also is expanded by engagement of the interior conical surface at the lower end of the expanding sleeve 152 with the upwardly facing conical surface 140 on the upper end of the pin housing 136.

A force is thus generated that expands the slit of expanding sleeve 152. The outer surface of the expanding sleeve 152 then tightly engages and grips the inner surface of the respective bore 150 in the stationary vise jaw 104 with the stationary jaw in place on the lock pin assembly 130. When the expansion of the sleeve 152 takes place, the stationary center vise block 104 is gripped by the expanding sleeve 152 and further threading of the capscrew 166 forces or squeezes the stationary block 104 against the surfaces 22 to tightly clamp and load the stationary vise block or jaw 104 against the rail surfaces 20 so that there is no relative movement possible. The stationary vise block 104 is held very securely, but yet is quickly changed. The downward force on the stationary vise block 104 is obtained by tightening the capscrew 166, because the expanding sleeves 152 will grip the inner surface of the bore 150 and provide a force that will tighten the stationary center block 104 downwardly against the rail upper surfaces.

The pin housings 132 are centered by the cone surfaces in the rail 14, so that the pin housings are precisely and rigidly positioned, and the stationary block 104 is held so that it is very rigid.

The stationary block 104, and/or its jaw plates 104A and 104B as well as the jaw plates on the movable jaws, can be replaced with other types of jaws, such as carving jaws, and other special purpose conventional jaws and jaw plates quickly and easily.

FIGS. 8–11 show a series of steps for the clamping of parts, as shown, different size parts in the two stations of the vise.

Figures 8, 8A, 8B:
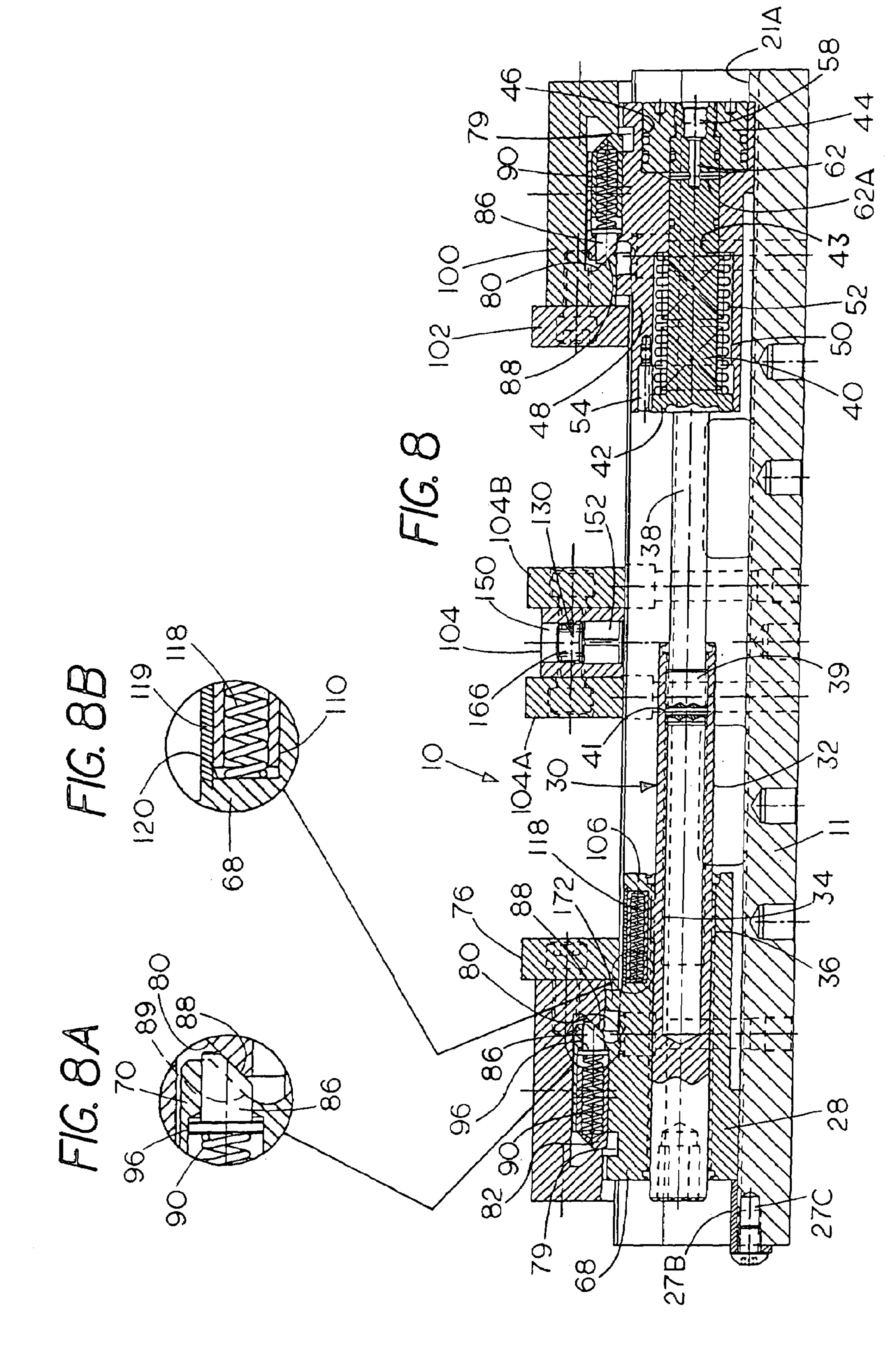
FIG. 8 is a sectional view similar to FIG. 2 and showing the two station vise of the present invention in a fully opened jaw position.
FIG. 8A is a fragmentary enlarged sectional view of a pre-loading plunger engaged with a front jaw.
FIG. 8B is a fragmentary enlarged sectional view showing an end portion of a setup block having a jaw retracting spring mounted in a front nut.

FIG. 8 illustrates the two station device with regular hard jaws in a fully open position, and set for manual or hydraulic operation. In this position, the springs 118 as shown in FIG. 8B will have moved the nut 28 relative to the sliding block assembly 110 in which the springs 118 are mounted with the surface 120 spaced from the end of the sliding assembly block 110, as can be seen. A lug 172 on jaw nut 28 that is positioned in a recess underneath the jaw 70 is spaced from the jaw plate. The preload plunger 86, as shown in FIG. 8A is extended, and the back end of the jaw nut head 70 is against the rear edge 79 of the recess 72 in the first jaw 74.

It can be seen in FIG. 8A the inclined wedge surface 88 of the plunger 86 is extending outwardly from the clamping ramp surface of the jaw nut head 70 which is represented by the dotted line at 89 in FIG. 8A.

The plunger 86 on the second jaw 100 also is in the same position as the plunger shown in FIG. 8A, with both plungers 86 extended from the jaw nut heads 70.

Figures 9, 9A, 9B:
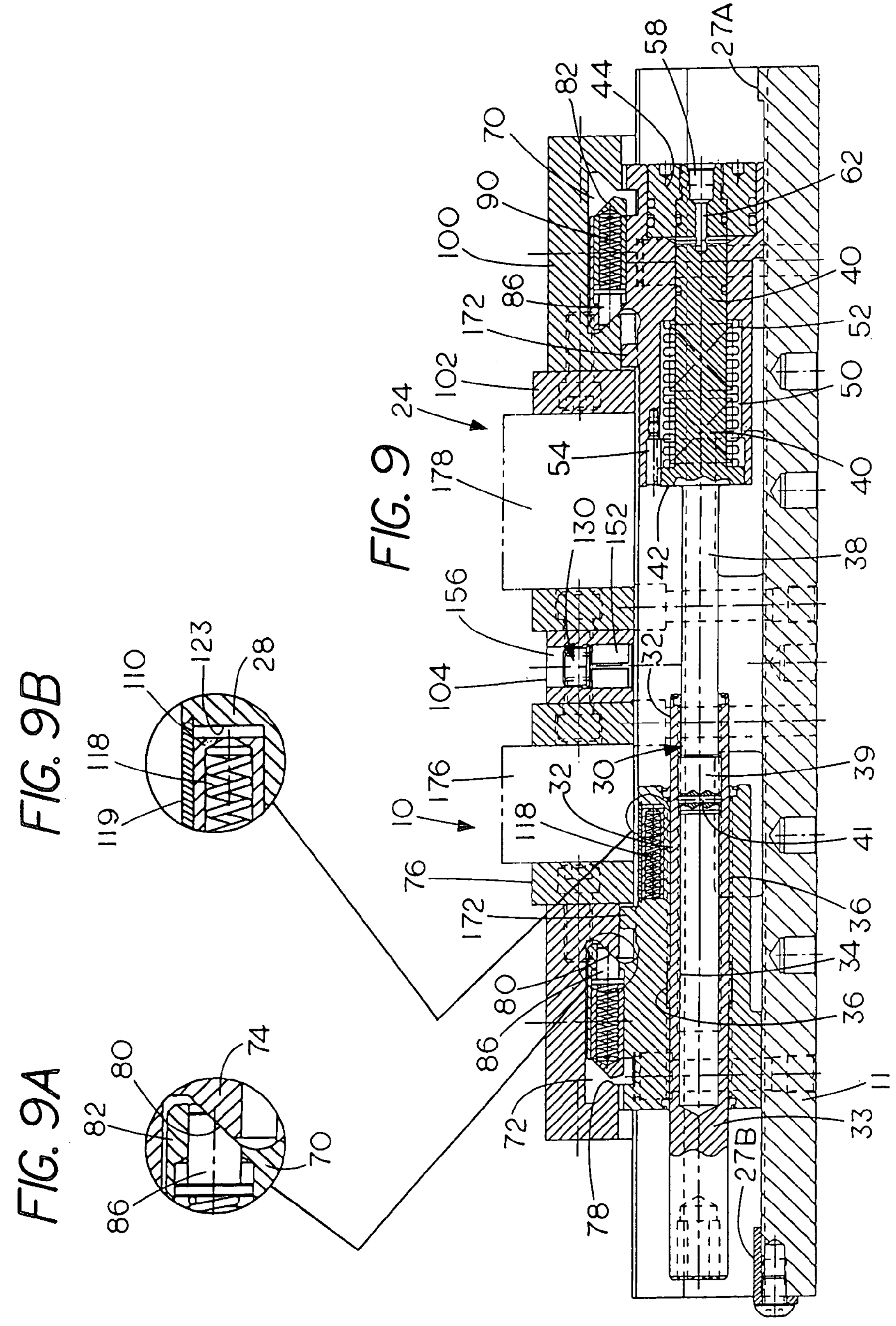
FIG. 9 is a sectional view similar to FIG. 8 and showing second step is clamping of two different size parts in the two station vise of the present invention.
FIG. 9A is a fragmentary enlarged sectional view of the pre-load plunger shown in FIG. 8A in its position during the second step.
FIG. 9B is a fragmentary enlarged sectional view of an opposite end of the setup block and retraction springs from the showing in FIG. 8B showing the position of the jaw nut and setup block during the second step.

Step two in clamping parts in the two station vise is shown in FIGS. 9, 9A and 9B, and two parts of unequal size are illustrated. A smaller part 176 is in the front station, and a larger part 178 is in the rear station. These positions of the parts can be reversed and the vise will still clamp both parts. The telescoping tubular vise screw assembly 30 has been manipulated by rotating the tubular section 32 manually with a handle to thread the two nuts 28 and 48 together, and carry the jaws 74 and 100 toward the respective part to be clamped against the stationary jaw or block 104. The threading of the vise screw moves both of the engaged threads, so that the screw shaft section 38 threads inwardly on the internal thread 34 and the external threads move the front jaw nut 28. The threads 34 on the interior and 36 on the exterior are opposite "hand" or lead, with the exterior threads being left hand thread and the internal threads that move the screw section 38 being right hand threads. As the external threads move the front jaw nut 28 toward the part 176 to be clamped the internal threads cause the screw section 38 to telescope into the tubular section 32 and move the jaw nut 48 toward the part 178.

Because the parts 176 and 178 are of different size, the jaw plate 102 on the jaw 100 being moved by the nut 48 will contact part 178 first, and because the movable jaw assembly is a floating jaw assembly 24, further turning of the screw tubular section 32 will cause the jaw 100 and jaw plate 102 to remain stationary, relative to the vise body, but the front jaw 74 will continue to move until it contacts the part 176.

Once the parts 176 and 178 have both been contacted, the plungers 86 on the both of the jaws 74 and 100 are retracted or pushed in as shown in FIG. 9A, so that the surfaces 89 of the heads 70 of both jaws 70 and 100 are bearing against the respective inclined wedge surface of the front or first jaw 74 and on the second or rear jaw 100.

Note the position of the lugs 172. Since the spring 90 has been compressed and the plunger 86 on both jaw nut heads have been retracted, lugs 172 have moved against the respective jaw plate 76 and 102.

The parts 176 and 178 are now held with a manual force vise screw which holds the parts against the jaw plates of the stationary block 104.

The sliding block assembly 110, which is frictionally loaded against the surfaces 22 will be moved by the front nut 28, by compressing the springs 118 until the surface 120 will push on the end of the sliding block assembly 110 to slide it along the guide rails by overcoming the friction force generated by the center elastomeric plug 116. FIG. 9B shows this position, with the springs 118 compressed into the bores in the sliding block assembly 110, and the sliding block assembly 110 spaced from the surface 123 of the recess 108 in the nut 28.

The vise screw section 32 is rotated clockwise manually to clamp the two parts held by the vise whether the parts are the same or different sizes. The larger part can either be in the front or rear vise station for clamping. The floating vise jaw assembly permits this to occur and the sliding block assembly 110 is automatically set to its correct position.

Figures 10, 10A, 10B:
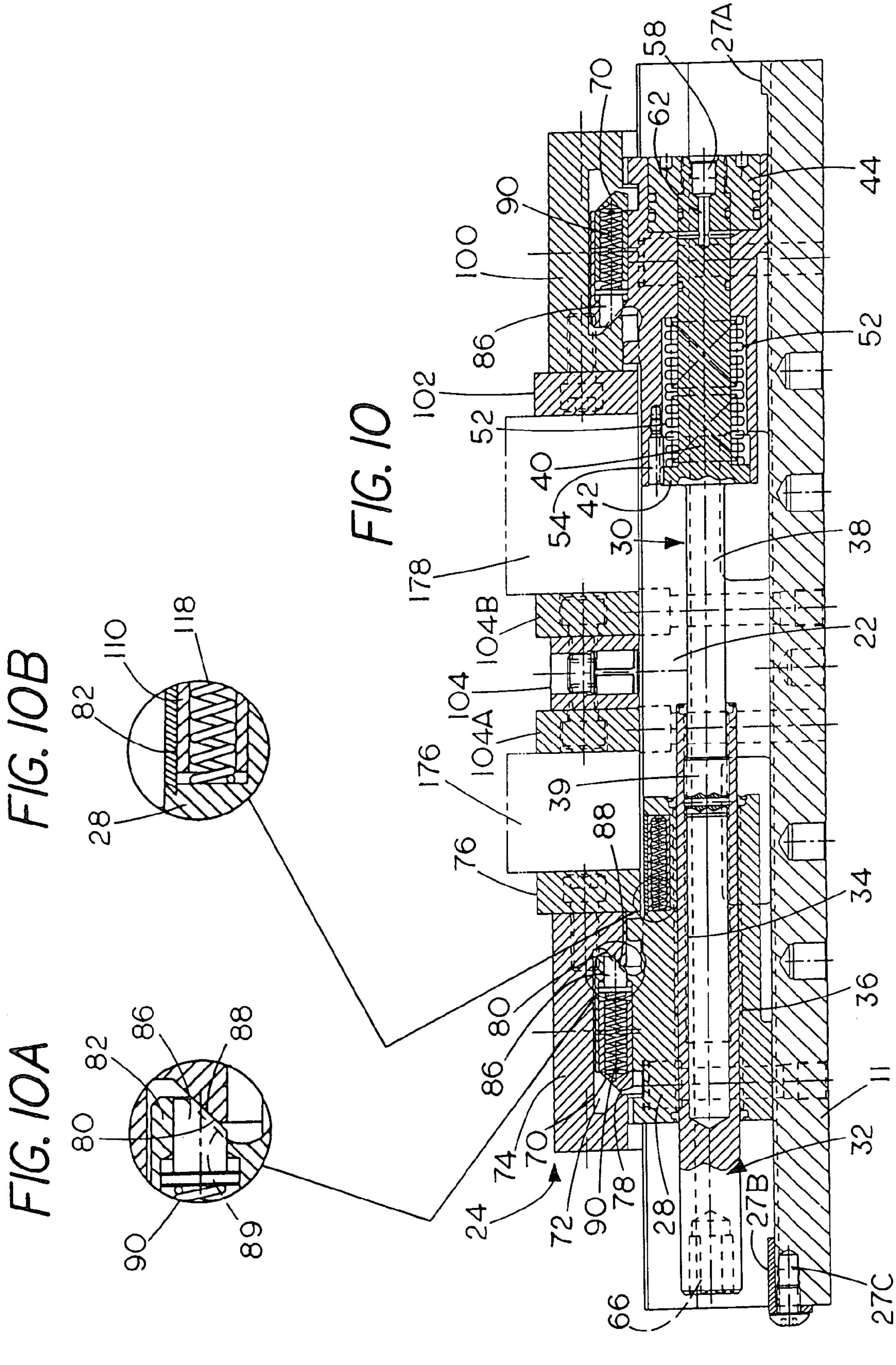
FIG. 10 is a sectional View of the two station vise similar to FIG. 9 showing a third step of the part clamping process, where a pre-load force is provided on the parts being clamped in the two station vise.
FIG. 10A is a fragmentary enlarged sectional view of the end of the pre-load plunger shown in FIGS. 8A and 9A in its position for pre-loading parts.
FIG. 10B is a fragmentary enlarged sectional view of the setup slide block and the jaw retraction springs in position during the third step.

Step 3, shown in FIGS. 10, 10A and 10B shows the vise after the parts 176 and 178 have been clamped by rotating the screw manually, as shown in FIG. 9. The tubular screw section 32 is then turned counterclockwise one turn, which will retract the front and rear nut assemblies (using the internal and external threads of the telescoping screw assembly) so that the pre-load plungers 86 of each of the jaws will be approximately midrange of the pre-load plunger travel. This position is shown in FIG. 10A, where the dotted line representation 89 again shows the wedge surface of the jaw nut head 70. It can be seen therefore, that in this position the load on the respective parts 176 and 178 is caused by the springs 90 of both of the plungers 86 acting on its respective jaw 74 and 100. The springs 90 on the plungers 86 provide the pre-load on the respective parts being clamped.

Also, because the sliding block assembly 110 is frictionally held against the surfaces 22 of the rails, and springs 118 will move the jaw nut 28 to the position with the springs 118 extended as shown in FIG. 10B. The sliding block assembly will stop the movement of the nut 28 when the surface 123 engages the end of the sliding block assembly 110.

Figures 11, 11A, 11B:
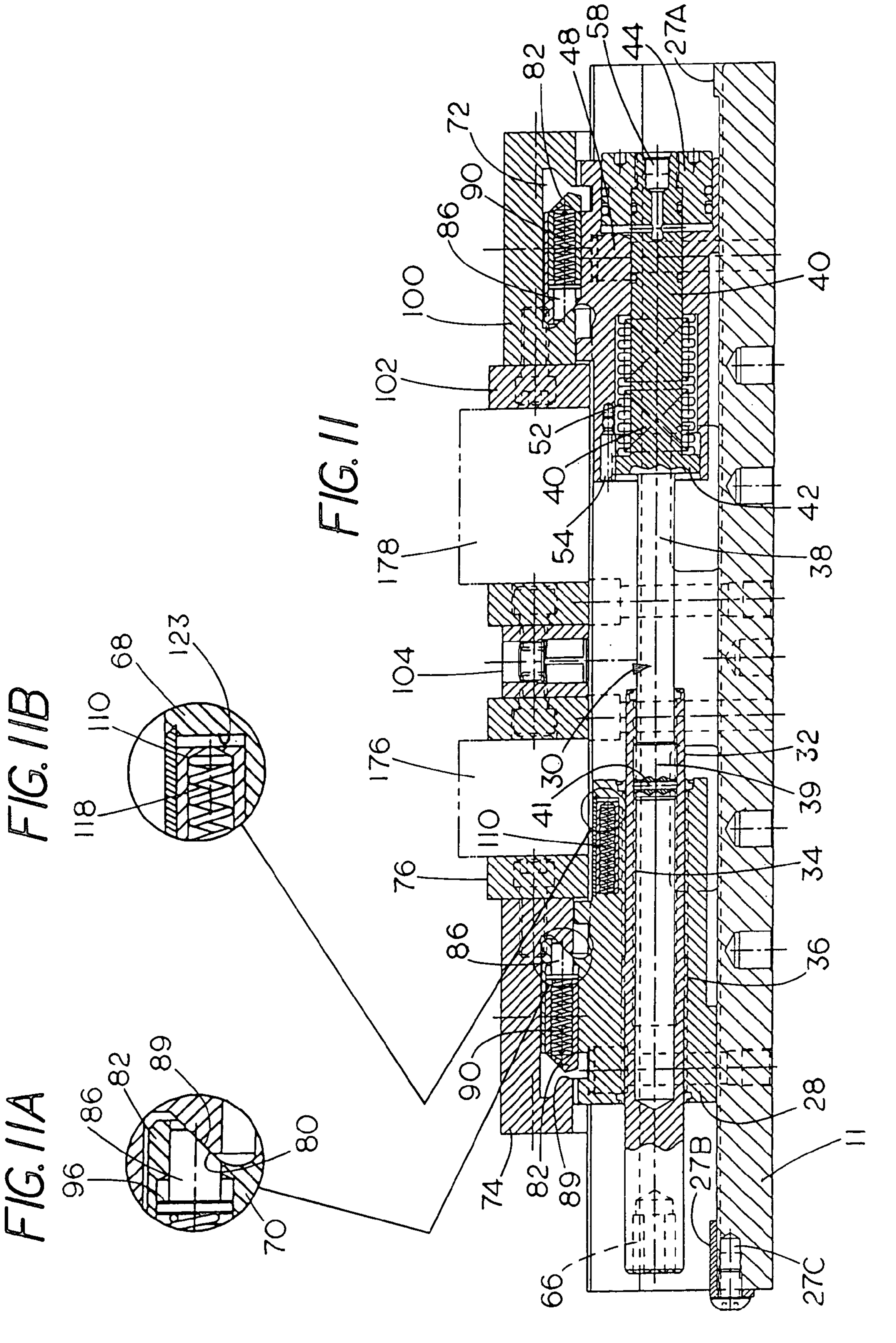
FIG. 11 is a sectional view of the two station vise similar to FIG. 10 showing a fourth step in the part clamping process wherein the parts being held are rigidly clamped in position for machining.
FIG. 11A is a fragmentary enlarged sectional view of the end of the pre-load plunger illustrating the metal to metal contact for providing the clamping force.
FIG. 11B is a fragmentary enlarged sectional view of an end of the setup block and retraction spring assembly shown in position during the fourth step.

Step four in clamping is shown in FIGS. 11, 11A and 11B, and is the final clamping. This is illustrated using hydraulic clamping. In this instance after step three, hydraulic fluid pressure has been provided from a source 59 through conduit 60 so that the piston 44 is under pressure and pulls the sliding shaft section 40, the screw section 38, and the tubular screw section 32 relative to the second jaw nut 48 to cause a clamping force against the respective parts. The plungers 86 on both of the jaw nut heads will retract, to the position at FIG. 11A so that the surface 89 of the respective nut heads 70 of nuts 28 and 48 will be directly engaging the mating surface of the respective jaws 74 and 100 so that there is positive clamping force. The sliding setup block assembly 110 remains in about the same position as in step three and the space between the sliding block assembly 110 and the end surfaces 120 and 123 on the nut 28 shifts from the position shown in FIG. 10B to the position shown in FIG. 11B, with the space now between the surface 123 and the adjacent end of the sliding block assembly 110. That means that the springs 118 are collapsed or retracted, and the nut provides direct compression loading on the jaws 74 and 100. The hydraulic piston 44 extends out the back of the second or rear nut 48, as shown in FIG. 11.

When the machining is completed on the parts 176 and 178, a valve which is part of the pump and valve assembly 59 is operated to relieve the pressure on the piston 44. The spring 52 then will act to force the sliding shaft section 40 to move the piston 44 into the bore 46, by acting between the flange 42 and the end of the bore 50.

The hydraulic oil will be expelled from the bore 46 by the force of spring 52. The oil is expelled and the force on the parts released at a measured rate that is fast enough for efficient operations. As the piston 44 retracts, the clamping pressure is relieved, and springs 118 in block 110 will act to retract the front jaw 28 relative to the stationary block 104. This movement will return the jaw assemblies to the pre-load position shown in step three. Manually backing off the screw assembly by turning the screw counterclockwise will relieve the load on the parts quickly. The vise is then ready for new parts to be clamped.

SUMMARY OF THE INVENTION

The vise of the present invention thus has an adjustable tubular drive for a floating movable jaw system in which the provided internal preloaded setup block 110 automatically positions the movable jaws properly.

In addition, it has a quick change stationary center block, using special precision locating and tightening quick change pins.

The movable jaws are such that they can be made to reverse in position, since the opposite ends of the opening 72 can be and are shaped identically, and the movable jaws as well as the stationary jaw can have carvable or hard jaw plates or jaws.

The vise has either manual or hydraulic power clamping, and the parts can be preloaded by the internal plungers shown. This feature is mostly applicable to hydraulic operation. They hydraulic operation has an internal single acting hydraulic cylinder with a retracting spring for releasing the parts at the end of the machining operation. The floating jaw system permits an independent positioning of larger or smaller parts at the respective stations, that is, if two different size parts are being machined, the larger part can be either at the front or the rear clamping station.

The vise can be oriented horizontally or vertically for work. It is also constructed with the individual sub-units that are designed for versatile accommodation of work pieces.

Although the present invention has been described with reference to preferred embodiments, workers skilled in the art will recognize that changes may be made in form and detail without departing from the spirit and scope of the invention.

What is claimed is:

1. A two station vise comprising a vise body, a longitudinal recess formed in said body, a stationary center block mounted in center portions of the body, a floating double vise jaw assembly mounted in the recess, said double vise assembly including a first vise jaw nut and a second vise jaw nut, a vise screw including a first tubular section having an outer surface threadably engaged with the first vise jaw nut, and having interior bore with internal threads, a second vise screw section threadable into the internal threads of the first vise screw section, the second vise screw section being connected to the second vise jaw nut such that tension on the second vise screw section causes movement of the second vise jaw nut toward the center block at the same time the first vise jaw nut is threaded toward the center block from an opposite side thereof.

2. The vise of claim 1, wherein said second vise screw section is connected to the second vise jaw with a head mounted on the end of the second vise jaw nut that engages an annular surface of the second jaw nut to carry tension loads from the second vise screw section to the second vise jaw nut.

3. The vise of claim 2, wherein said head comprises a piston slidably mounted in a bore in the second vise jaw nut, said annular surface forming a reaction surface, an inlet to permit hydraulic fluid pressure to enter between the annular surface and the piston to create a tension load on the second vise screw section.

4. The vise of claim 2, wherein said second vise screw section is slidably mounted in said second jaw nut for axial sliding movement, and a spring to urge said second vise screw section in a direction to seat the head against the annular surface of the second vise jaw nut.

5. The vise of claim 1, wherein said vise screw and said first and second vise jaw nuts are slidably mounted in the body recess for slidable movement along guides on the vise body, and stop members to stop movement of the floating jaw assembly beyond end portions of the vise body.

6. The vise of claim 1, wherein said first vise jaw nut carries a sliding block, the sliding block having surfaces that frictionally engage guide surfaces on the vise body to create a friction force resisting movement of the sliding block, and spring members on the sliding block engaging a portion of the first vise jaw nut to; provide a resilient force urging the vise jaw nut to move a limited distance relative to the sliding block away from the center block, the spring force being reacted by the friction force between the sliding block surfaces and the guide surfaces.

7. The vise of claim 6 further characterized by a recess in the first vise jaw nut for carrying said sliding block, the sliding block surfaces comprising side surfaces extending out of the recess in the first vise jaw nut.

8. The vise of claim 7, wherein the recess is defined by end surfaces in the vise jaw nut generally perpendicular to the side surfaces of the sliding block and perpendicular to a longitudinal axis of said vise screw, said end surfaces being spaced apart in longitudinal axial direction a greater distance than the distance of the sliding block in a longitudinal axial direction, the springs extending between a surface of the sliding block and an end surface of the first vise jaw nut recess.

9. The vise of claim 2, wherein said external threads on said first vise screw section are formed to have a first directional lead, and the internal threads in the interior of said first vise screw section are formed to have an opposite directional lead.

10. The vise of claim 8, wherein the sliding block has a plurality of springs therein, and the total force from said springs being a selected amount less than a clamping load exerted on parts mounted between the center block and respective first and second vise jaws moved by the first and second vise jaw nuts.

11. The vise of claim 6, wherein said guide surfaces comprise planar generally parallel surfaces that are spaced apart and extend along a longitudinal length of the vise body and are parallel to a longitudinal axis of the vise screw, said sliding block being mounted in a recess in the first vise jaw nut and extending between the parallel guide surfaces, said sliding block comprising first and second sliding block sections each having one edge surfaces engaging a respective one of the parallel guide surfaces, and a resilient member tending to separate the first and second sliding block sections to create a friction force between the one edge surfaces of the first and second sliding block sections and the parallel guide surfaces of the vise body.

12. The vise of claim 11, wherein said recess in said first vise jaw nut for receiving said sliding block has an axial length longer than the axial length of the sliding block.

13. The vise of claim 1, wherein each of said vise jaw nuts carries a vise jaw, a pre-load plunger in each of said vise jaw nuts that is spring loaded to create a force urging the respective vise jaws toward the center block relative to the respective vise jaw nut, said pre-load plungers retracting to permit metal to metal contact between the vise jaws and surfaces of the respective vise jaw nut when a clamping force on the vise jaws exceeds a preselected amount.

14. A vise having a vise body, the vise body having a pair of rails that are spaced apart and which extend longitudinally, a center stationary block mounted on said vise body and extending across the rails, and a pair of moveable vise jaws slidably mounted relative to the rails, a first vise jaw being on a first side of the center block and a second vise jaw being on an opposite second side of the center block, a first vise jaw nut coupled to the first vise jaw, a second vise jaw nut coupled to the second vise jaw, a vise screw assembly including a first vise screw section threadably connected to said first vise jaw nut with threads on the exterior of the first vise screw section, and a second vise screw section connected to said second vise jaw nut to provide a tension carrying connection between the second vise screw section and the second vise jaw nut, said second vise screw section being threadably mounted into an interior bore of the first vise screw section, and the threads on the exterior of said first vise screw section and on the interior of the bore of the vise screw section being such that upon rotating the first vise screw section in one direction, both the first and second vise jaws are moved toward the center block, and when rotated in an opposite direction, the first and second vise jaws both move away from the center block.

15. The vise of claim 14, wherein said tension carrying connection between the second vise screw section and the second vise jaw comprises a hydraulic piston attached to the second vise screw section and mounted in a bore in the second vise jaw nut, said hydraulic piston facing a surface at an end of the bore in the second vise jaw nut, whereby hydraulic fluid under pressure introduced between the surface at the end of the bore in the second vise jaw nut and the piston creates a tension loading on the second vise screw section.

16. The vise of claim 15, wherein said center stationary block is held in position with two lock pins that include a housing threadably mounted in the respective rails, the housing and a bore into which the housing is threaded in the respective rails having mating conical surfaces that engage when the housing is threaded into the bore, the housing having a wedging exterior surface above the respective rail, and a split expanding sleeve having an interior conical surface that engages the outer conical surface of the respective housing, and a threadable member for urging the expanding sleeve toward the wedging conical surface on the housing to expand the sleeve into a bore on the stationary block into which the sleeve is placed.

* * * * *

UNITED STATES PATENT AND TRADEMARK OFFICE

CERTIFICATE OF CORRECTION

PATENT NO. : 7,163,201 B2
APPLICATION NO. : 10/998482
DATED : January 16, 2007
INVENTOR(S) : Bernstein It is certified that error appears in the above-identified patent and that said Letters Patent is hereby corrected as shown below:

TITLE PG, ITEM (57)
Abstract:

LINE 3
After the word “reversible” the letter “t” should be -- T --

Column 11, claim 6, line 44:

After “to” delete -- ; --

Column 12, claim 13, line15:

“surfaces” should be -- surface --

Column 12, claim 13, line 28:

“jaws” should be -- jaw --

Signed and Sealed this

Twelfth Day of June, 2007

JON W. DUDAS
*Director of the United States Patent and Trademark Office*